3,382,074
ANTIHALATION LAYER
Shiro Kimura, Odawara-shi, Tsukasa Awa and Teruhiko Yonezawa, Kanagawa-ken, and Teruo Kobayasi, Odawara-shi, Japan, assignors to Fuji Shashin Film Kabushiki Kaisha, Kanagawa-ken, Japan
No Drawing. Filed Feb. 25, 1965, Ser. No. 435,328
Claims priority, application Japan, Mar. 24, 1964, 39/15,861
8 Claims. (Cl. 96—84)

The present invention relates to a photographic antihalation layer in which a synthetic resin is used as a binder and a novel magenta triphenylmethanic dye is used as a coloring agent.

Synthetic resins and dyes that can be used as photographic antihalation layers are required to have the following properties. First of all, such a synthetic resin must be soluble in an alkaline developing liquid and also in an organic solvent for coating liquid, such as, methanol, ethanol, butanol, acetone, and ethyl acetate. As the suitable synthetic resins having such a property have been known the following materials. That is, they are a polymerization product of cresol, salicilic acid or oxyphenyl acetic acid, and formaldehyde; a polymerization product of acrylic acid, methacrylic acid, or styrene carboxylic acid; a copolymer of vinyl chloride and maleic anhydride; a copolymer of vinyl chloride and acrylic acid; a copolymer of vinyl acetate and maleic anhydride; a copolymer of acrylonitrile and styrene carboxylic acid; a copolymer of styrene and maleic anhydride; a copolymer of a vinylalkyl ether and styrene sulfonic acid; and a semi-synthetic resin of a cellulose acetic acid-phthalic acid ester or a cellulose acetic acid-maleic acid ester. That is, acid resins having phenolic OH groups, COOH groups or $SO_3H$ groups in the molecules are useful.

Then, the dye must have the properties that it is not discolored or faded by the above-mentioned resin, it is weak soluble or insoluble in water but soluble in an alkaline developing liquid and can be decolored. Further, the dye must be easily soluble in an organic solvent for coating liquid such as ethanol with a high color density. If the dye is weak soluble in ethanol, etc., there is the following defect. That is, since the surface tension and the viscosity of a coating liquid prepared by the organic solvent such as ethanol are low, the coating amount per unit area is small and the thickness of the formed layer after drying is very thin, that is, the amount of the coated dye is small, wheich makes the preparation of an antihalation layer having a high color density impossible. Hence, the antihalation effect is an ortho region (green-sensitive region) of a photographic emulsion becomes imperfect.

Hitherto, magenta dyes to be used together with the synthetic resins for the antihalation in the ortho region of a photographic emulsion have been disclosed in, e.g., British Patent No. 790,023, or German Patent 1,038,395.

However, the compound shown by the formula

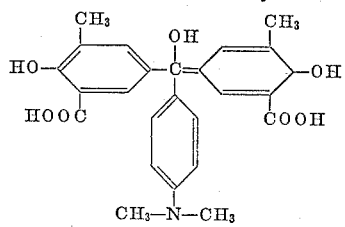

which is a typical example of the dyes shown in the British patent is weak soluble in ethanol, that is the solubility of the above-mentioned dye in ethanol is less than 1% at room temperature. Furthermore, the color density of the dye is lowered by the acidity of the resin and the color density is, on the contrary, increased in an alkaline state by resonance coupling. The reason is considered to be that the structure of the dye is an oxonol type and a merocyanine type. Moreover, the dye has the drawback that the surface of an emulsion layer is contaminated into magenta by a photographic developing or fixing treatment, in particular, by a fixing solution containing aluminum ions of alum. This is considered to be caused by the dye being laked.

The typical example of the dyes shown in the German patent is

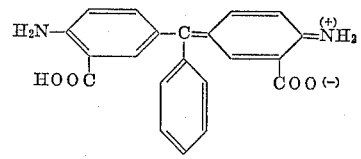

but the dye has a sensitivity reducing property to emulsions. The reason is considered to be that the property of the dye is comparatively largely dominated by the amino group and hence the dye has a property similar to a basic dye.

Further, there is disclosed a dye having one or two $SO_3H$ groups in Belgian Patent No. 632,536, in which the typical example is

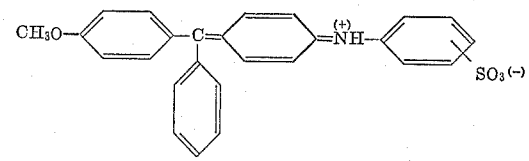

but the dye is weak soluble in organic solvent such as ethyl alcohol as compared with the dyes in the present invention. Also, as the dye of the Belgian patent has a high hygroscopic property, there is a defect that the dye, when used in an antihalation layer, soften the resin layer and injure the properties or qualities of the layer.

Therefore, an object of this invention is to provide an antihalation layer for photography containing an improved magneta dye.

A still further object of this invention is to provide novel magneta dyes having improved properties suitable for use in an antihalation layer for photography.

These and other objects of this invention as well as the advantages of this invention will become clear from the following descriptions.

The dye used in this invention is a dye of the 4-alkoxy-N-(dicarboxyphenyl)fuchsonimine series showing the following general formula

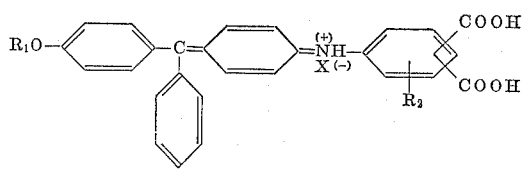

or

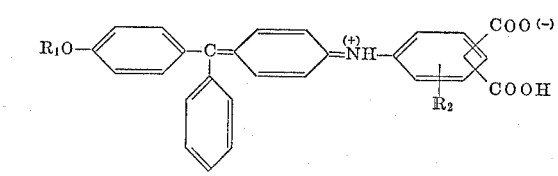

wherein $R_1$ is a lower alkyl group or an aralkyl group, $R_2$ is hydrogen, a hydroxyl group or a halogen, and X is an acid residual group.

One of the structural and photographic features of the dye in the invention is that the dye has $OR_1$ at the 4th position of the triphenylmethane group. That is, as the dye is an ether type, the dye is easily soluble in organic solvents and as the oxygen atom at the 4th position is an onium of $O(+)$, the dye causes resonance coupling in particular at an acid state and increases the color density. Other feature of the dye in this invention is that the dye is acid dye having two COOH groups in one molecule. Then, since the dye of this invention is easily soluble in organic solvents such as ethyl alcohol as compared with the dye of the Belgium patent having one or two $SO_3H$ groups in one molecule and also the dye is almost insoluble in water as well as has no hygroscopic property, the dye does not soften the resin layer used in an antihalation layer. Therefore, there occurs no sticking phenomenon of the antihalation layer to a photosensitive material or a packing material which is brought into contact with the layer.

The dye of this invention can be dissolved in ethyl alcohol at room temperature in a proportion of about 30%, and the molecular extinction coefficient of the dye in the antihalation layer is above several ten thousands. Also, the dye does not give bad influences, such as, fogging and sensitivity reduction, on a photographic emulsion. Furthermore, the dye of this invention is dissolved even in developing liquids quickly and in colorless transparency and neither staining nor contamination occurs in the developed photographic emulsion layer even after fixing, water-washing and drying.

The dye of this invention may be synthesized as follows.

That is, 1 mole of an aminophthalic acid is caused to react with 1 mole of 4,4'-dialkoxy(or benzyloxy)triphenyl carbinol in a organic solvent such as acetic acid at a temperature of 80° C. to the boiling point of the solvent. Then, water is added in the reaction system to deposit the formed crude dye, which is filtered and dissolved in acetone. After removing a small amount of insoluble impurities, the solution is added with an acid such as hydrochloric acid to convert the dye into the dye salt, which is recrystallized from the acetone solution.

The aminophthalic acid used in the synthesis can include one the benzene nucleus of which has usual substituent, such as, OH and a halogen.

The removal of impurities is as follows. The unreacted 4,4'-dialkoxytriphenyl carbinol and the Cl salt thereof are soluble in acetone. The aminophthalic acid and the hydrochloride thereof are soluble in water and acetone. A by-produced 4,4' bisamino dye, that is, a blue-green dye formed by the addition of 1 excessive mole of the aminophthalic acid to the 4' position of triphenyl carbinol is insoluble in acetone. The dye of this invention is, when it is an inner-molecular salt and an acetate, soluble in acetate but is weak soluble when it is a Cl salt. By utilizing the above-mentioned properties, the pure product can be synthesized by using water, acetone and hydrochloric acid. The typical examples for synthesizing the dyes of the present invention are as follows.

Synthesis 1.—N-(3,5-dicarboxyphenyl) - 4 - methoxyfuchsonimmonium chloride

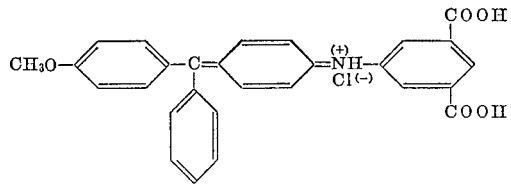

A mixture of 32. g. of 4,4'-dimethoxytriphenyl carbinol (cf. Ber. Chem. vol. 36, page 2787; ibid., vol. 42, page 2170; and German Patent No. 12468) (0.1 mole), 18.1 g. of 5-aminoisophthalic acid (0.1 mole), and 50 ml. of acetic acid was heated to 100° C. for about 1 hour with stirring. The mixture was colored into magenta by a demethanol reaction. Then, about ½ proportions of the acetic acid was distilled off under a reduced pressure and water was added into the reaction system to deposit the crude dye, which was dissolved into about 200 ml. of acetone followed by filtration. When the filtrate was added with above 10 g. (0.1 mole) of concentrated hydrochloric acid and the system was let alone for one day, the aforementioned Cl salt dye was precipitated. After filtering by suction, the precipitated product was washed with acetone to give 29 g. of a crystal having the melting decomposition point of 233–235° C. The yield was 60%, the nitrogen analysis 2.90%, the calculated value 2.88%, and the maximum absorption spectrum of the product in an acetic acid solution showed at 555 n.m.

Synthesis 2.—N-(3,5-dicarboxyphenyl)-4-ethoxyfuchsonimine

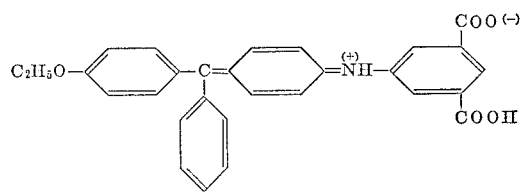

A mixture of 34.8 g. of 4,4'-diethoxytriphenyl carbinol (cf. Ber. Chem.; vol. 57, page 597 and German Patent No. 12468) (0.1 mole), 18.1 g. of 5-aminoisophthalic acid (0.1 mole), and 40 ml. of acetic acid was boiled at 118° C. for about 30 minutes and was treated as in Synthesis 1. Into thus obtained 1 mole of the Cl-salt dye was added 3 mole-equivalent of caustic soda as a 3% aqueous solution and after dissolving the dye at room temperature, the solution was filtered. The pH of the filtrate containing the disodium salt was adjusted to 4–5 with the addition of acetic acid. When the solution was heated to about 50° C. for several minutes to precipitate a product, which was filtered by suction, washed with water, and dried to give 25 g. of the dye having the above structure. The yield was 54%, the melting decomposition point 205–206° C., the nitrogen analysis 3.08%, and the calculated value 3.01%. Further, it was confirmed by a pH-titration curve that the formed dye was not an acetate but was an inner molecule salt. The maximum absorption of the dye in an acetic acid solution was at 555 n.m., and the dye was almost similar to the magenta dye in Synthesis 1.

Synthesis 3.—N-(2,3-dicarboxyphenyl)-4-methoxyfuchsonimmonium chloride

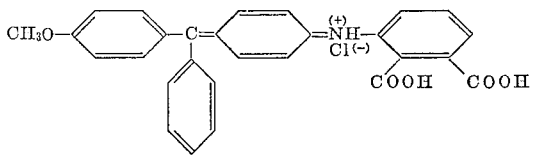

By using 3-aminophthalic acid instead of 5-aminophthalic acid in Synthesis 1, the same treatments as in Synthesis 1 were conducted. The reaction temperature was reduced to 80° C. and the proportion of the acetic acid in the reaction solvent was reduced to 30 ml. By the treatment, 32 g. of a dark violet crystal was obtained. The yield was 64%, the melting decomposition point 153–155° C., the nitrogen analysis 2.93%, calculated value 2.88%, and the maximum absorption of the dye in an acetic acid solution was at 550 n.m., and showed magenta

Synthesis 4.—N-(3,4-dicarboxyphenyl)-4-benzyloxyfuchsonimmonium sulfate

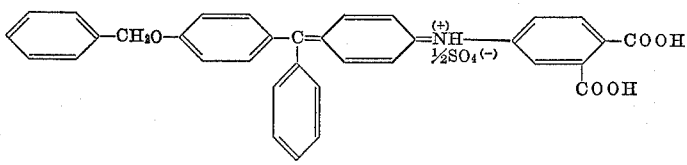

A mixture of 47.2 g. (0.1 mole) of 4,4'-dibenzyloxy-triphenyl carbinol (cf. Ber Chem., vol. 57, page 597 and German Patent 12,468), 18.1 g. (0.1 mole) of 4-aminophthalic acid, and 40 ml. of acetic acid was refluxed at 118° C. for about 50 minutes then the system was treated as in Synthesis 1. At that, diluted sulfuric acid was used in this case instead of hydrochloric acid. A dark violet crystal was obtained with the yield of 61%. An acetic acid solution of the dye showed a reddish violet and the 1st maximum absorption was at 560 n.m. The 2nd maximum absorption was at 410 n.m. and the optical density was about ⅓ of the optical density in the 1st maximum absorption.

Synthesis 5.—N-(2,5-dicarboxyphenyl)-4-methoxyfuchsonimine

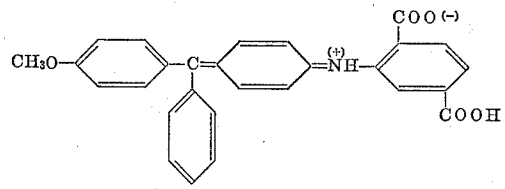

Instead of 5-aminoisophthalic acid in Synthesis 1, 5-aminoterephthalic acid was used and the system was treated as in Synthesis 1. By treating thus obtained Cl-salt dye with a caustic soda solution as in Synthesis 2, an inner molecule salt dye was obtained. A violetish crystal powder was obtained with the yield of 55% and the maximum absorption of an acetic acid solution of the dye was 550 n.m. showing magenta.

Synthesis 6.—N-(2,4-dicarboxy-5-hydroxyphenyl)-4-methoxyfuchsonimine

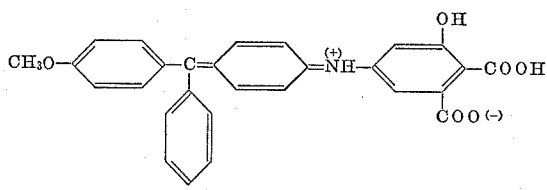

By using 4-amino-6-hydroxy-isophthalic acid, the system was treated as in Synthesis 5 and the dark violet crystal powder was obtained with the yield of 51%.

The maximum absorption of an acetic acid solution of the dye was at 555 n.m. showing a magenta.

Synthesis 7.—N-($(x)$, $(x+1)$-Dicarboxy-$(x+2)$-chlorophenyl)-4-methoxyfuchsonimine (where $(x)$, $(x+1)$, and $(x+2)$ each shows the substituted position of the phenyl group, and $x$ is 2, 3 or 4).

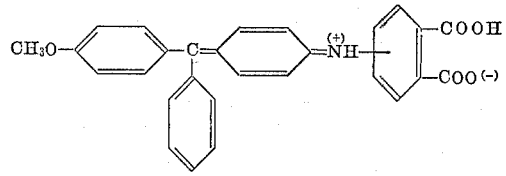

The system was treated as in Synthesis 5 while X(position)-amino-3-chloro-phthalic acid (prepared by reducing 3-chloro-X(position)-nitrophthalic acid with iron and hydrochloric acid) was used in the case.

The dark violet powdered crystal was obtained with the yield of 62%. The acetic acid solution of the dye showed a magenta and the maximum absorption spectrum of it showed a flat curve from 555 n.m. to 560 n.m.

The invention will be explained further in detail referring the following examples, however, it should be understood that the invention is not limited to the specific examples by any means.

EXAMPLE 1

Into 0.5 liter of ethyl alcohol were dissolved 45 g. of the dye obtained in Synthesis 1 and 40 g. of a copolymer of vinylbutyl ether and maleic anhydride to prepare a coating solution. The coating solution was applied on a back of a support for a photographic emulsion followed by drying to give a high density antihalation layer colored in a deep reddish violet. The colored layer had a good antihalation effect for an ortho emulsion and was decolored quickly and completely in an alkaline developing liquid. Also, when the original solution was further diluted with ethyl alcohol and was applied on the support in a dye amount of 0.09 g. per 1 sq.m., the maximum absorption was shifted to about 15 n.m. long wave side from the case of the acetic acid solution of the dye, that is, was at 570 n.m., and the optical density in the maximum absorption wave length was 1.0.

The results of the deterioration tests of developing liquids by the dye were as follows. That is, when 0.35 g. of the dye was dissolved in 1 liter of a developing liquid and by using such a developing liquid, a usual photographic material was treated, no sensitivity reduction to the emulsion and no stain or no recoloring in the emulsion appeared.

EXAMPLE 2

Into 0.5 liter of isopropanol were dissolved 20 g. of the dye prepared in Synthesis 2 and 30 g. of a poly condensation product of paraoxybenzoic acid and formaldehyde and the solution was applied and dried as in Example 1 to give a deep reddish violet antihalation layer. When the coated amount of the dye was 0.09 g. per 1 sq.m., the maximum absorption was at 570 n.m. and the optical density was 1.0. The original coating solution was added with 22 g. of a blue-green dye having the following structural formula

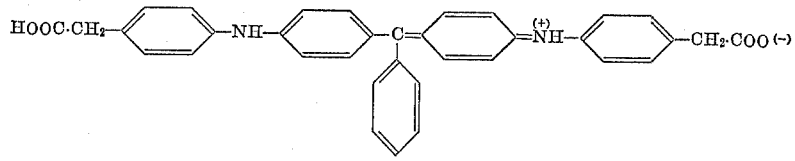

(maximum absorption 665 n.m.) and applied on a support followed by drying to give a halation preventing layer, which absorbed a whole visible region completely and showed a good antihalation effect for a panchromatic emulsion.

EXAMPLE 3

Five grams of the dye prepared in Synthesis 3 was dissolved into 1.5 liter of a 3% ethyl alcohol solution of a polycondensation product of phenoxy acetic acid and paracresol dimethylol. Thus formed solution was applied on the back of a support and dried. When the dye was coated in an amount of 0.09 g./sq.m., the maximum absorption was at 560 n.m. and the optical density of 0.9.

EXAMPLE 4

Ten grams of the dye prepared in Synthesis 4 and 50 g. of a copolymer of vinyl acetate and maleic anhydride were dissolved into a mixed solution of 1 liter of isopropyl alcohol and 0.5 liter of ethyl alcohol. The solution was coated and dried as in Example 1 to give a reddish violet antihalation layer having the maximum absorption at 570 n.m. When the coated amount of the dye was 0.09 g./sq.m,. the optical density of the wave length at the maximum absorption was 1.0.

EXAMPLE 5

Twenty grams of the dye prepared in Synthesis 5 and 30 g. of a copolymer of styrene and maleic anhydride were dissolved into 0.5 liter of ethanol and the solution was coated and dried to give a reddish violet antihalation layer having the maximum absorption at 560 n.m. When the dye was coated in an amount of 0.09 g./sq.m., the optical density at 560 n.m. was 0.9.

EXAMPLE 6

Into a mixed solution of 0.5 liter of ethyl alcohol and 0.5 liter of ethyl acetate were dissolved 5 g. of the dye prepared in Synthesis 6, 10 g. of the dye prepared in Synthesis 7, and 30 g. of a polycondensation product of salicylic acid and formaldehyde, and the solution was coated and dried as in Example 1 to give a reddish violet antihalation layer having the flat maximum absorption range near 570 n.m. When the coated amount of the total dyes was 0.09 g./sq.m., the optical density near the maximum wave lengths was 1.0.

What is claimed is:

1. A photo-sensitive material having an antihalation layer comprising a synthetic resin binder and a dye of the 4-alkoxy-N-dicarboxyphenyl)fuchsonimine series shown by the general formula

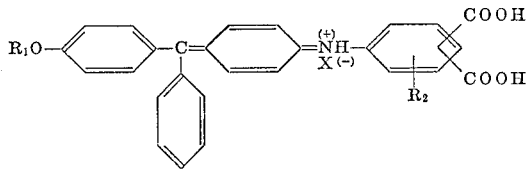

or

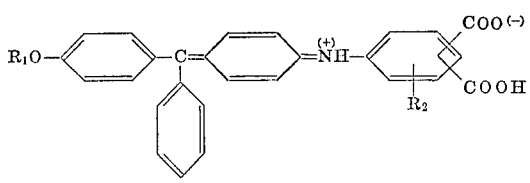

wherein $R_1$ is a member selected from the class consisting of a lower alkyl group and an aralkyl group, $R_2$ is a member selected from the class consisting of hydrogen, a hydroxyl group and a halogen, and X is an acid residual group.

2. The photosensitive material layer according to claim 1 wherein said dye is N-(3,5-dicarboxyphenyl)-4-methoxyfuchsonimmonium chloride.

3. The photosensitive material layer according to claim 1 wherein said dye is N-(3,5-dicarboxyphenyl)-4-ethoxyfuchsonimine.

4. The photosensitive material layer according to claim 1 wherein said dye is N-(2,3-dicarboxyphenyl)-4-methoxyfuchsonimmonium chloride.

5. The photosensitive material layer according to claim 1 wherein said dye is N-(3,4-dicarboxyphenyl)-4-benzyloxyfuchsonimmonium sulfate.

6. The photosensitive material layer according to claim 1 wherein said dye is N-(2,5-dicarboxyphenyl)-4-methoxyfuchsonimine.

7. The photosensitive material layer according to claim 1 wherein said dye is N-(2,4-dicarboxy-5-hydroxyphenyl)-4-methoxyfuchsonimine.

8. The photosensitive material layer according to claim 1 wherein said dye is N-($(x)$, $(x+1)$-dicarboxy-$(x+2)$-chlorophenyl) - 4 - methoxyfuchsonimine, wherein $(x)$, $(x+1)$ and $(x+2)$ each shows the substituted position of the phenyl group and $x$ is 2, 3 or 4.

References Cited

UNITED STATES PATENTS

| | | | |
|---|---|---|---|
| 2,904,433 | 9/1959 | Coenen et al. | 96—84 |
| 2,913,351 | 11/1959 | Ossenbrunner et al. | 96—84 |
| 3,005,711 | 10/1961 | Burgardt et al. | 96—84 |

FOREIGN PATENTS

| | | |
|---|---|---|
| 1,357,261 | 2/1964 | France. |

NORMAN G. TORCHIN, *Primary Examiner.*

R. H. SMITH, *Assistant Examiner.*